United States Patent
Scholz et al.

(10) Patent No.: US 11,851,918 B2
(45) Date of Patent: Dec. 26, 2023

(54) MOTOR VEHICLE LOCK

(71) Applicant: Brose Schließsysteme GmbH & Co. Kommanditgesellschaft, Wuppertal, Wuppertal (DE)

(72) Inventors: David Scholz, Roznov pod Radhostem (CZ); Jiri Beinstein, Lichnov (CZ); Lee Kwanggi, Rochester Hills, MI (US)

(73) Assignee: Brose Schließsysteme Gmbh & Co. Kommanditgesellschaft, Wuppertal, Wuppertal (DE)

(*) Notice: Subject to any disclaimer, the term of this patent is extended or adjusted under 35 U.S.C. 154(b) by 279 days.

(21) Appl. No.: 16/920,928

(22) Filed: Jul. 6, 2020

(65) Prior Publication Data

US 2022/0003025 A1 Jan. 6, 2022

(51) Int. Cl.
| | |
|---|---|
| *E05B 81/16* | (2014.01) |
| *E05B 81/06* | (2014.01) |
| *E05B 81/34* | (2014.01) |
| *E05B 81/50* | (2014.01) |
| *E05B 85/04* | (2014.01) |
| *B62D 33/037* | (2006.01) |

(52) U.S. Cl.
CPC ............ *E05B 81/16* (2013.01); *B62D 33/037* (2013.01); *E05B 81/06* (2013.01); *E05B 81/34* (2013.01); *E05B 81/50* (2013.01); *E05B 85/04* (2013.01); *E05Y 2201/10* (2013.01); *E05Y 2201/42* (2013.01); *E05Y 2201/438* (2013.01); *E05Y 2201/47* (2013.01); *E05Y 2201/624* (2013.01); *E05Y 2201/706* (2013.01); *E05Y 2201/71* (2013.01); *E05Y 2900/546* (2013.01)

(58) Field of Classification Search
CPC .......... E05B 81/16; E05B 81/34; E05B 81/06; E05B 81/50; E05B 81/90; E05B 85/04; B62D 33/037; E05Y 2201/10; E05Y 2201/42; E05Y 2201/438; E05Y 2201/47; E05Y 2201/624; E05Y 2201/706; E05Y 2201/71; E05Y 2900/546
See application file for complete search history.

(56) References Cited

U.S. PATENT DOCUMENTS

| | | | | |
|---|---|---|---|---|
| 5,020,838 | A * | 6/1991 | Fukumoto | ............... E05B 81/14 |
| | | | | 292/216 |
| 5,632,515 | A * | 5/1997 | Dowling | ................. E05B 81/14 |
| | | | | 292/216 |
| 11,280,120 | B2 * | 3/2022 | Patane | .................... E05B 81/34 |
| 2009/0160198 | A1 * | 6/2009 | Yoda | ........................ E05B 81/16 |
| | | | | 292/201 |

(Continued)

*Primary Examiner* — Kristina R Fulton
*Assistant Examiner* — James Edward Ignaczewski
(74) *Attorney, Agent, or Firm* — Dickinson Wright PLLC (57) ABSTRACT

A latch for use in a vehicle including a catch, a pawl, a motor including a motor shaft, and drivetrain including, a first gear and a pawl lifter. The first gear is configured to rotate about a first axis as the motor shaft rotates when the drivetrain is in the operating state and defining an aperture configured to receive an opening tool and translate along the first axis from a first position to a second position to change the drivetrain from the operating state to the service state, when the opening tool is inserted into the aperture. When the first gear is in the second position, the first gear is configured to pivot the pawl lifter to move the pawl from the pawl closed position of the pawl open position.

18 Claims, 6 Drawing Sheets

(56) References Cited

U.S. PATENT DOCUMENTS

| | | | |
|---|---|---|---|
| 2014/0203573 A1* | 7/2014 | Lujan | E05B 81/00 |
| | | | 292/217 |
| 2016/0312499 A1* | 10/2016 | Fannon | E05B 81/06 |
| 2017/0089112 A1 | 3/2017 | Rosales et al. | |
| 2017/0342749 A1* | 11/2017 | Nelson | E05B 79/10 |
| 2018/0087298 A1* | 3/2018 | Strole | B62D 33/037 |

* cited by examiner

MOTOR VEHICLE LOCK

TECHNICAL FIELD

The present disclosure is related to a motor vehicle lock for a hatch leaf.

BACKGROUND

A motor vehicle lock arrangement may include a motor vehicle lock that may be coupled to any kind of hatch leaf of a motor vehicle. Accordingly, the expression "hatch leaf" is to be understood in a brought sense. This includes in particular any kind of doors of a motor vehicle such as side doors or back doors as well as tailgates, lift gates, trunk lids or engine hoods. This also includes the rear hatch leaf of a pickup truck.

In order to provide a holding function for the hatch leaf in its closed position, the motor vehicle lock may include a catch for the interaction with a lock striker and a pawl for holding the catch at least in its primary closed position. In its primary closed position, the catch is in holding engagement with the lock striker, which leads to the hatch leaf to be held in its closed position.

SUMMARY

According to at least one embodiment, a motor vehicle lock is provided. The motor vehicle lock may include a catch configured to engage a lock striker, and pivotable about a geometrical catch axis, and a pawl having a pawl arm for the interaction with the catch, which pawl arm is pivotable about a geometrical pawl axis which in particular is different from the geometrical catch axis. Preferably, the catch and the pawl arm are pivotable in a common plane. The motor vehicle lock can be brought into at least one closed state, in particular a primary closed state and preferably also a secondary closed state, in which the catch is in a respective closed position, in particular a primary closed position or secondary closed position, and in which the catch is in direct holding engagement with the lock striker. In the closed state the pawl arm of the pawl is in an associated closed position, in which the pawl arm is in direct holding engagement with the catch blocking the catch in its closed position.

The primary closed state of the motor vehicle lock is the state, in which the catch is in direct holding engagement with the lock striker and the hatch leaf is fully closed. The secondary closed state of the motor vehicle lock is a state, in which the catch is also in direct holding engagement with the lock striker, but not yet pivoted further into its primary closed position. In the secondary closed state, the hatch leaf is not yet fully closed.

When the pawl arm is in an open position, which is the position, in which the pawl arm releases the catch, the motor vehicle lock can be brought into an open state, in which the catch is in an open position and releases the lock striker. In the open state of the motor vehicle lock the hatch leaf can be opened.

The present disclosure may be based on the idea that, by using an opening tool, the electric motor can be decoupled from the rest of the drivetrain extending downstream to the pawl arm to pivot the pawl arm. Additionally, as soon as the electric motor is decoupled, the same opening tool can be used to actuate the rest of the drivetrain and, respectively, to pivot the pawl arm. The opening tool is an "external" element, which means that it is not part of the vehicle lock, but is preferably an element that is anyway carried by the user and/or that is anyway stored in the vehicle, e.g. the motor vehicle key, a screwdriver or the like. Accordingly, in case that the electric motor has a malfunction or does not have electrical power, the user has the possibility to open the motor vehicle lock and, respectively, the hatch leaf easily in another way. This service function is especially advantageous for hatch leaves that do not include a handle.

In detail, it is proposed that one of the drivetrain components can be engaged with an opening tool and can be displaced with the opening tool in a displacement direction so that the drivetrain is set from the operating state to a service state in which the drivetrain is separated between this displaceable drivetrain component and the electric motor, and that by, in particular manually, moving, preferably rotating, the opening tool in the service state, the displaceable drivetrain component is actuated in an actuating direction so that the drivetrain is actuated without the electric motor to pivot the pawl arm about the geometrical pawl axis, in particular from its closed position into its open position.

The displacement direction and the actuating direction of the displaceable drivetrain component may be different. For example, the actuating direction is the same direction in which the displaceable drivetrain component is moved, e.g. rotated, in the operating state of the drivetrain, that is in the state of normal use when the drivetrain is not separated. The displacement direction is in particular a direction orthogonal to the actuating direction.

According to one or more embodiments, an opening is provided through which the user can insert the opening tool from the outside to the displaceable drivetrain component. In case the motor vehicle lock is installed at the hatch leaf, that opening is provided in the hatch leaf, e.g. in the sheet metal of the hatch leaf. In a different embodiment it is also conceivable that the motor vehicle lock is installed at the vehicle body. In this case the opening is provided in the vehicle body.

The motor vehicle lock may include a drive housing defining a housing opening through which the displaceable drivetrain component is accessible to the opening tool from the outside. That housing opening is different from the opening in the hatch leaf or vehicle body, such that the opening tool, to come into engagement with the displaceable drivetrain component, has to be passed through the opening of the hatch leaf or vehicle body before reaching the housing opening of the drive housing.

In one or more embodiments, the displaceable drivetrain component may be preloaded, especially spring-loaded, against its displacement direction.

The displaceable drivetrain component may be a gear wheel.

In one or more embodiments, the motor vehicle lock may include a pawl lifter which acts on the pawl to pivot the pawl arm. That pawl lifter receives the driving force from the displaceable drivetrain component when the latter is actuated by the electric motor (in the operating state) or manually by the opening tool (in the service state).

The catch may pivot towards the catch open position by the same drivetrain which is used to pivot the pawl arm. Preferably the catch can also be pivoted towards its open position in the service state of the drivetrain by using the opening tool.

In one or more embodiments, the motor vehicle lock may include a driving rotor which receives the driving force from a drivetrain component may include the pawl lifter or from the displaceable drivetrain, and a catch transmitting element being connected to the catch in a rotationally fixed manner, which catch transmitting element receives a driving force from the driving rotor to pivot the catch.

A freewheel mechanism may be provided. The freewheel mechanism may allow the drivetrain to first pivot the pawl arm from its closed position towards its open position and then to pivot the catch from its closed position towards its open position.

BRIEF DESCRIPTION OF THE DRAWINGS

In the following, the invention will be described with reference to an exemplary embodiment illustrated in the drawings. In the drawings show

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock (US 2017/0089112 A1) includes a catch and a pawl. When the lock is in the primary closed state, the pawl arm of the pawl is in direct holding engagement with the catch blocking the catch in its closed position.

It is generally desirable, in order to simplify operation, that individual components of the motor vehicle lock such as the catch and/or the pawl should be motor-operated. In this way, a motor vehicle lock can be opened by motor, for example. However, in such a case it is desirable that the motor vehicle lock can still be opened in the event of motor failure.

Figure 1:
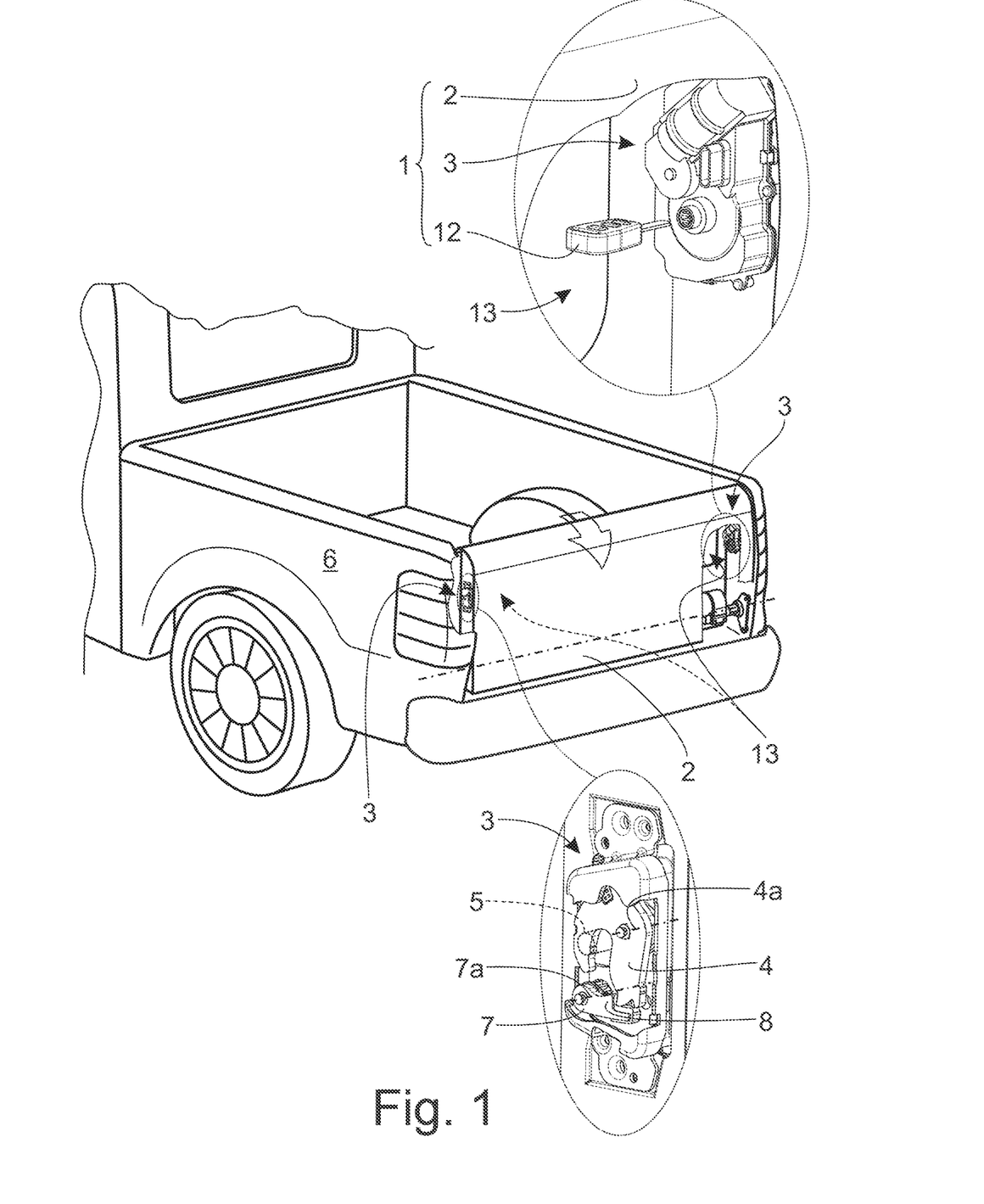
FIG. 1 is a schematic view of a motor vehicle comprising a proposed motor vehicle lock arrangement with a proposed motor vehicle lock.

The motor vehicle shown in FIG. 1 may include a motor vehicle lock arrangement 1 for a hatch leaf 2. Regarding the brought understanding of the expression "hatch leaf" reference is made to the introductory part of the specification.

The hatch leaf 2 may be pivotable about a hatch axis, which is aligned basically horizontally. It is also conceivable, that the hatch axis is aligned vertically.

The proposed motor vehicle lock arrangement 1 may include a motor vehicle lock 3. Just as a matter of completeness, it may be pointed out that the hatch leaf 2 is assigned not only one motor vehicle lock 3, but here two motor vehicle locks 3, that are arranged on opposite sides of the hatch leaf 2. In the following, only the motor vehicle lock 3 on the right side of the hatch leaf 2 is described. All explanations given to this motor vehicle lock 3 are fully applicable to the motor vehicle lock located on the opposite side of the hatch leaf 2.

Figure 2:
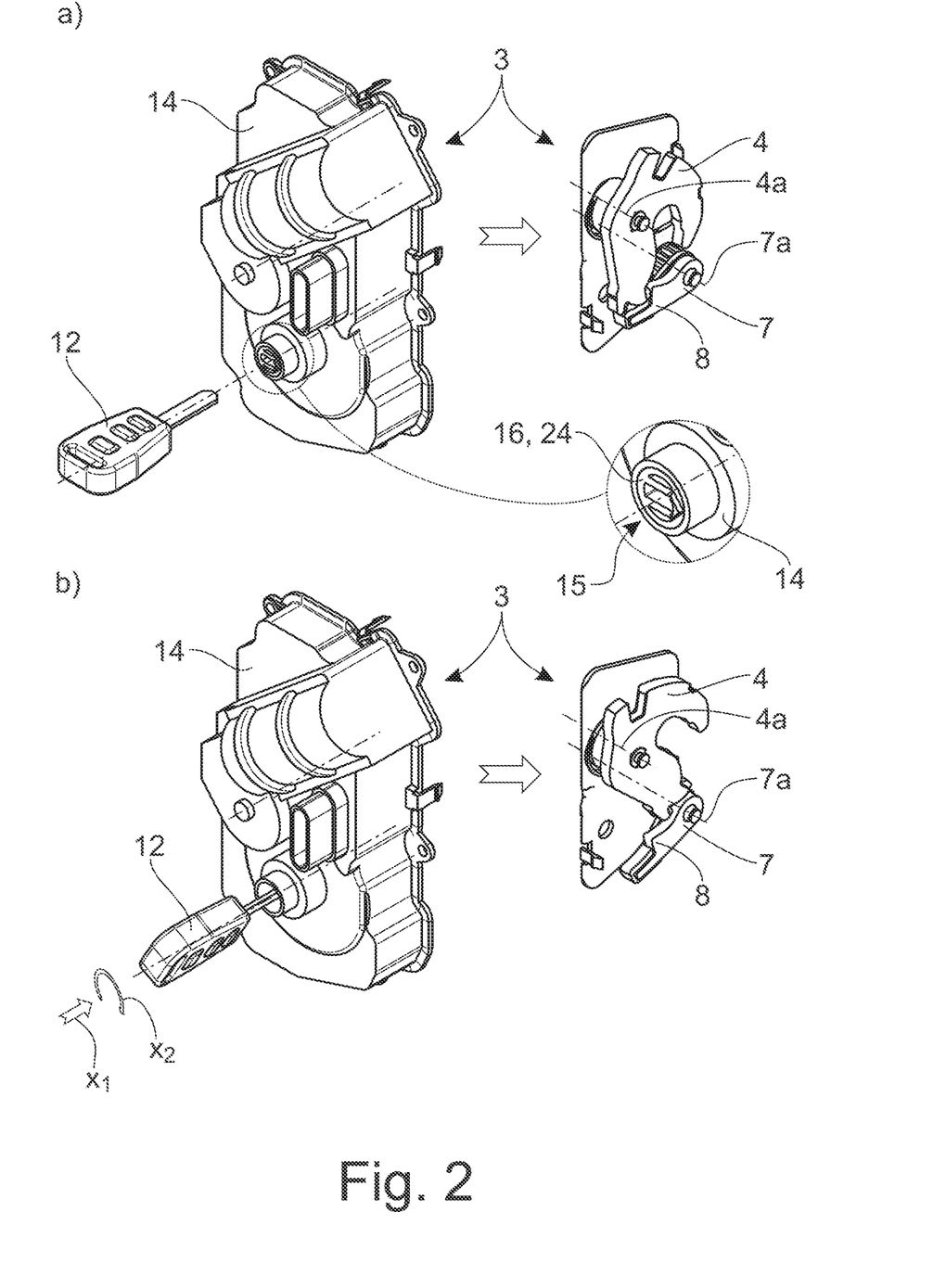
FIG. 2 is a perspective view of the motor vehicle lock a) before carrying out a service function and b) after the service function has been carried out.
Figure 3:
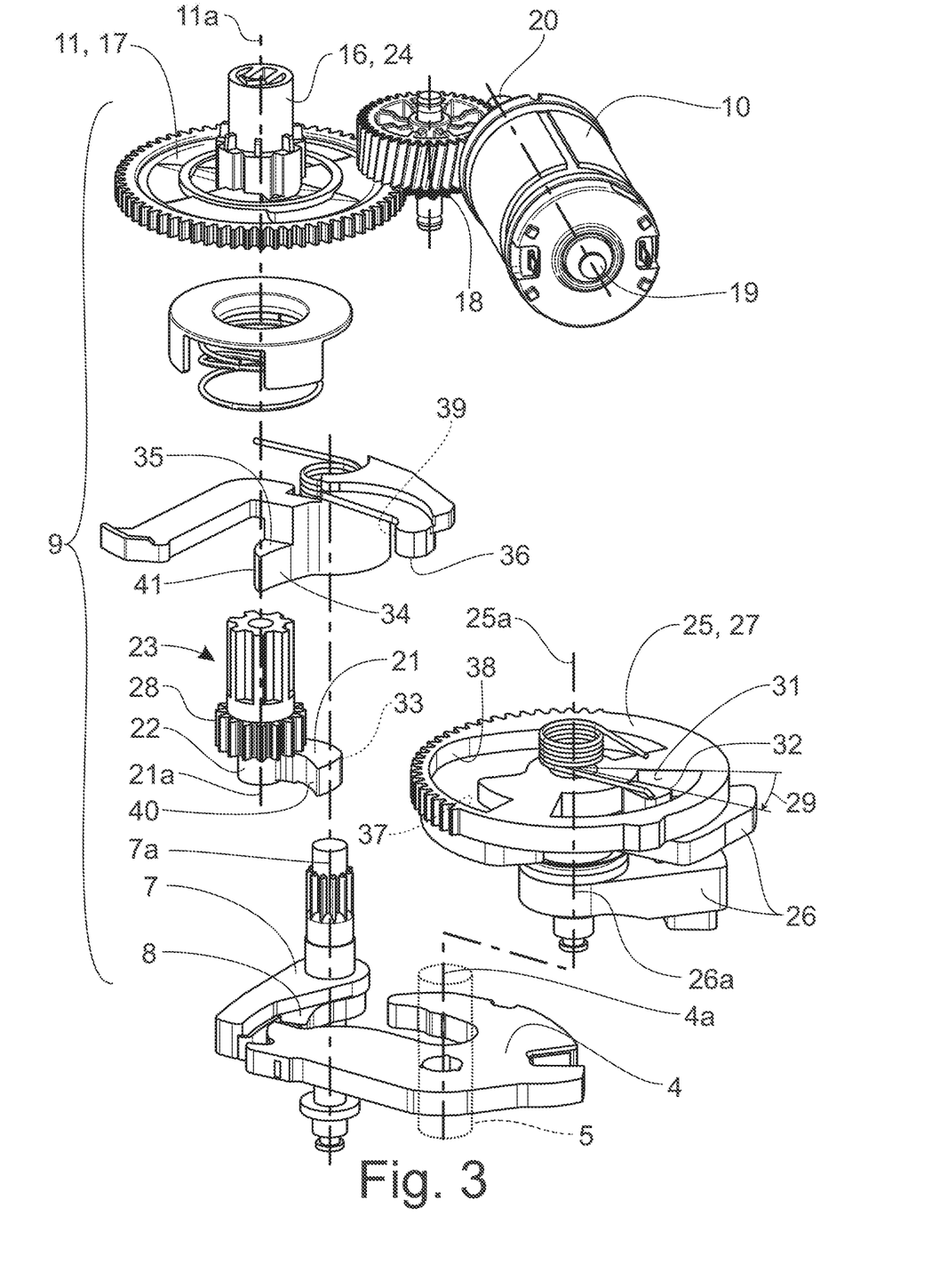
FIG. 3 is an exploded view of a drivetrain of the motor vehicle lock.

FIGS. 1 to 3 show that the motor vehicle lock 3 may include a catch 4 for the interaction with a lock striker 5. The lock striker 5 may be located at the motor vehicle body 6. It is also possible, that the lock striker 5 is positioned at the hatch leaf 2, such that the motor vehicle lock 3 is then positioned at the motor vehicle body 6.

The catch 4 is pivotable about a geometrical catch axis 4a. The motor vehicle lock 3 further may include a pawl 7 having a pawl arm 8, which pawl arm 8 is pivotable about a geometrical pawl axis 8a. As an example, the geometrical catch axis 4a is different from the geometrical pawl axis 8a, in particular distant from and parallel to the geometrical pawl axis 8a.

The motor vehicle lock 3 can be brought into at least one closed state, in which the catch 4 is in a closed position and in direct holding engagement with the lock striker 5 and in which the pawl arm 8 is in an associated closed position, in which the pawl arm 8 is in direct holding engagement with the catch 4 blocking the catch 4 in its respective closed position.

FIG. 2a) shows in an exemplary embodiment a closed state of the motor vehicle lock 3 with the catch 4 being in its respective closed position. As an example, the motor vehicle lock 3 can be brought into a primary and into a secondary closed state, and in the primary closed state the catch 4 is in a first closed position (not shown) and in the secondary closed state the catch 4 is in a second closed position (FIG. 2a)). In both closed positions the pawl arm 8 is in its associated closed position. Here, the closed position of the pawl arm 8 in the primary closed state of the vehicle lock 3 is basically identical with the closed position of the pawl arm 8 in the secondary closed state of the motor vehicle lock 3.

Moreover, as is shown in FIG. 2b), when the pawl arm 8 is in its open position, the catch 4 is released and the motor vehicle lock 3 can be brought into its open state, in which the catch 4 is in its open position and releases the lock striker 5.

Moreover, FIG. 3 shows that the motor vehicle lock 3 may include a drivetrain 9 consisting of several drivetrain components which, when engaged with each other in an operating state of the drivetrain 9, can transmit a driving force from an electric motor 10 to the pawl arm 8 to pivot the pawl arm 8 about its geometrical pawl axis 8a, in particular from its closed position into its open position.

The expression "engaged" means that the components are coupled in a manner that a driving force and/or a movement, e.g. a rotational movement, can be transmitted to the respective adjacent drivetrain component.

The expression "driving force" is to be understood in a brought sense and includes forces as well as torques.

The electric motor 10 is the first one of the drivetrain components of the drivetrain 9 and generates the driving force. From the electric motor 10 the drivetrain 9 extends downstream to the pawl 7 and pawl arm 8, respectively. In a further embodiment, which will be described later, the drivetrain 9 may also extend from the electric motor 10 downstream to the catch 4, and in particular the drivetrain 9 transmits a driving force to both the catch 4 and the pawl 7 and pawl arm 8.

As an example, the pawl 7 and therefore the pawl arm 8 on one hand and/or the catch 4 on the other hand is preloaded, especially spring-loaded. In particular, the pawl 7 is preloaded from its open position towards its closed position and/or the catch 4 is preloaded from its closed position towards its open position. Accordingly, in a normal state, by the preload, the pawl arm 8 is driven, in particular spring-driven, from its open position into its closed position and/or the catch 4 from its respective closed position at least into its open position. The expression "normal state" means that all drivetrain components including the pawl 7 and/or catch 4 are moveable as intended. However, under certain conditions, for example due to icing or dirt, the pawl 7 and/or the catch 4 can also jam. For such a case, in an alternative embodiment it is also conceivable, that, additionally or alternatively, the pawl 7 and pawl arm 8 are motor driven from the open position towards the closed position and/or the catch 4 is motor driven from the closed position towards the open position, in particular at least until it reaches its open position, in an alternative embodiment also until it reaches an overtravel position beyond its open position from the direction of its closed position.

One of the drivetrain components 11 may be engaged by an opening tool 12 and can be displaced with the opening tool 12 in a displacement direction x1 so that the drivetrain 9 is set from the operating state to a service state in which the drivetrain 9 is separated between this displaceable drivetrain component 11 and the electric motor 10, and that by, such manually, moving, e.g., rotating, the opening tool 12 in the service state, the displaceable drivetrain component 11 is actuated in an actuating direction x2 so that the drivetrain 9 is actuated without the electric motor 10 to pivot the pawl arm 8 about the geometrical pawl axis 7a, in particular from its closed position into its open position.

The expression "the drivetrain is separated" means that drivetrain 9 is divided into a first section including the electric motor 10 and a second section extending from the displaced drivetrain component 11 to the pawl arm 8. Accordingly, in the service state the displaced drivetrain component 11 remains in engagement downstream towards the pawl arm 8 such that an actuation of the displaced drivetrain component 11 causes the pivoting of the pawl arm 8, in particular from its closed position into its open position. When separated, no driving force can be transmitted between the first and the second drivetrain section.

The opening tool 12 which is not part of the motor vehicle lock 3 is for example, as shown in FIGS. 1 and 2, a motor vehicle key. Accordingly, it is also conceivable that the drivetrain component 11 can only be engaged with a motor vehicle key assigned to that specific motor vehicle and not with any other motor vehicle key or other tool.

By means of that opening tool 12 the displaceable drivetrain component 11 can be actuated without the electric motor 10 by carrying out to separate movements one after the other, one movement displacing the drivetrain component 11 in the displacement direction x1 and the other movement moving, such as rotating, the drivetrain component 11 in the actuating direction x2. This sequence of movements provides a service function for the motor vehicle lock 3 and the motor vehicle lock arrangement 1.

As an example, the displacement direction x1 of the displaceable drivetrain component 11 is different from the actuating direction x2 of the displaceable drivetrain component 11. The displacement direction x1 of the displaceable drivetrain component 11 runs along a straight line and/or the actuating direction x2 of the displaceable drivetrain component 11 runs along a circular path, in particular in a plane orthogonal to the displacement direction x1 of the displaceable drivetrain component 11, that the displacement direction x1 of the displaceable drivetrain component 11 runs parallel to a geometrical component axis 11a about which the displaceable drivetrain component 11 rotates when being actuated in its actuating direction x2.

In this regard it is to be noted the geometrical component axis 11a may run parallel to and distant from the geometrical pawl axis 7a and/or parallel to and distant from the geometrical catch axis 4a.

Moreover, as can been seen in FIG. 1, the hatch leaf 2, or in the sheet metal forming the hatch leaf 2, an opening 13 is provided through which the opening tool 12 can be inserted from the outside into the inside of the hatch leaf 2 for engagement with the displaceable drivetrain component 11. This is particularly preferable in case that the motor vehicle lock 3 is installed at the hatch leaf 2 and the assigned lock striker 5 is installed at the motor vehicle body 6. However, it is also conceivable that the motor vehicle lock 3 is installed at the motor vehicle body 6 and the assigned lock striker 5 is installed at the hatch leaf 2. In particular for that case it could be provided that a corresponding opening 13 is provided in the motor vehicle body 6, in particular in the sheet metal forming the motor vehicle body 6, through which the opening tool 12 can be inserted from the outside into the inside of the motor vehicle body 6 for engagement with the displaceable drivetrain component 11. As an example, the opening tool 12, for engagement with the displaceable drivetrain component 11 can be fully inserted into the hatch leaf 2 or, in the alternative embodiment, in the motor vehicle body 6, through the opening 13. In one or more embodiments, the respective opening 13 is provided at the side of the hatch leaf 2 directed towards the inside of the motor vehicle such that it is not seen from the outside of the motor vehicle, in particular from the back of the motor vehicle. The opening 13 may, as shown in FIG. 1, have dimensions that allow a user to introduce the opening tool 12 completely into the inside of the hatch leaf 2, in particular also with the user's hand.

Figure 4:
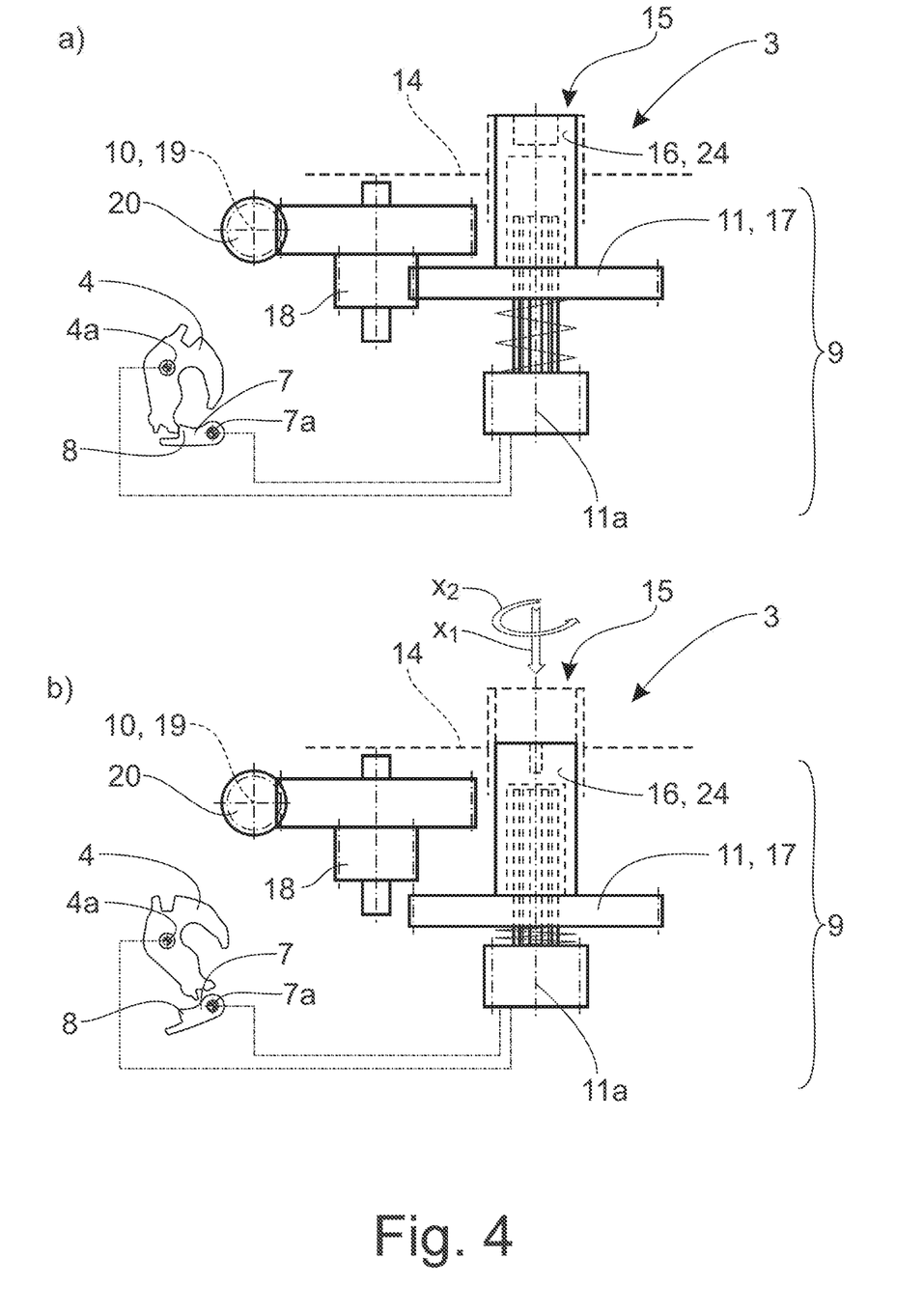
FIG. 4 is a schematic view of the process of the service function a) in an operating state of the drivetrain before carrying out the service function and b) in a service state of the drivetrain after the service function has been carried out.

In FIG. 2 a drive housing 14 of the motor vehicle lock 3 is shown, in which drive housing 14 the displaceable drivetrain component 11 is arranged, in particular together with the electric motor 10 and, as shown, here together with one or more further of the drivetrain components of the drivetrain 9. As an example, the drive housing 14 is accommodated in the inside of the hatch leaf 2, in particular in a cavity which is accessible through the described opening 13. As an example, the drive housing 14 may include a housing opening 15 through which the displaceable drivetrain component 11 is accessible to the opening tool 12 from outside. In the shown embodiment the displaceable drivetrain component 11 may include an engagement section 16 which protrudes through the housing opening 15 from the inside of the drive housing 14 when the drivetrain 9 is in its operating state and which can be moved further inside the drive housing 14 through the housing opening 15 by means of the opening tool 12, as shown in FIGS. 2a) and b) as well as in FIGS. 4a) and b).

Moreover, as shown in the exploded view in FIG. 3 and in the schematic view in FIG. 4, in the operating state of the drivetrain 9 the displaceable drivetrain component 11 is preloaded, especially spring-loaded, against its displacement direction. This means that in order to achieve a displacement, the drivetrain component 11 must be pushed by the opening tool 12 against a preload, e.g. generated by a spring, in the displacement direction x1. Such a preload has the advantage that, after the opening tool 12 has been removed and/or the opening tool 12 no longer exerts a pushing force in the displacement direction x1 on the drivetrain component 11, the displaced drivetrain component 11 can return into its initial position that it was in before the displacement.

As an example, the displaceable drivetrain component 11 is a component downstream of the electric motor. The expression "downstream" relates to the direction of transfer of driving force generated by the electric motor 10 (in the operating state of the drivetrain 9) and/or generated by the opening tool 12 (in the service state of the drivetrain 9).

As its shown in FIG. 3, the displaceable drivetrain component 11 may be a gear wheel 17 which, in the operating state of the drivetrain 9, is engaged with a motor-side gear wheel 18, the motor-side gear wheel 18 being connected to a motor shaft 19 of the electric motor in a rotationally fixed manner or, as shown in FIG. 3, being driven by a further gear wheel 20 that is connected to a motor shaft 19 of the electric motor 10 in a rotationally fixed manner.

In the operating state and in the service state of the drivetrain 9, the displaceable drivetrain component 11, when being actuated in its actuating direction by the electric motor 10 or by the opening tool 12, transmits a driving force to a pawl lifter 21, which than acts on the pawl 7 to pivot the pawl arm 8. Here the pawl lifter 21 is formed as an arm extending radially from a shaft 22. The expression "radially" means orthogonal to the axis of rotation of the shaft 22. When the displaceable drivetrain component 11 transmits a driving force to the pawl lifter 21, the pawl lifter 21 may rotate about a geometrical pawl lifter axis 21a, which is the named axis of rotation of the shaft 22. As an example, the geometrical pawl lifter axis 21a is coaxial with or parallel to the geometrical component axis 11a of the displaceable drivetrain component 11.

In this regard it is to be noted that the geometrical pawl lifter axis 21a runs parallel to and distant from the geometrical pawl axis 7a and/or parallel to and distant from the geometrical catch axis 4a.

As an example, the pawl lifter 21 is part of a separate drivetrain component 23 connected to the displaceable drivetrain component 11, in particular to a shaft 24 of the displaceable drivetrain component 11, in a rotationally fixed manner, the connection between the displaceable drivetrain component 11 and the separate drivetrain component 23 being in particular a plug connection, or, that the pawl lifter 21 is connected in a rotationally fixed manner, in particular integrally connected, to the displaceable drivetrain component 11, in particular to a shaft 24 of the displaceable drivetrain component 11.

The expression "separate" means that the drivetrain component 23 is an element different from the displaceable drivetrain component 11, which element can be coupled with or removed from the displaceable drivetrain component 11 in the course of an assembly. Both elements are manufactured as different parts.

The expression "integrally connected" means that the connection is a one-piece connection.

As an example, the separate drivetrain component 23 may include a shaft 22, and, as explained before, the pawl lifter 21 is an arm extending radially from that shaft 22.

As already explained above, in one or more embodiments, it is provided that, in the operating state of the drivetrain 9, the drivetrain 9 can transmit a driving force from the electric motor 10 to the catch 4 to pivot the catch 4 about its geometrical catch axis 4a, in particular in the direction from its respective closed position towards its open position. As an example, in the service state of the drivetrain 9, a driving force can be transmitted from the displaceable drivetrain component 11 to the catch 4 to pivot the catch 4 about its geometrical catch axis 4a, in particular in the direction from its respective closed position towards its open position.

This may be advantageous in a case where the catch 4 is preloaded, in particular spring-loaded, from its respective closed position towards its open position, but is jammed in its respective closed position, for example due to icing or dirt. The jamming can then be released by motor force. It is also conceivable, that the catch 4 should only be able to be moved by the electric motor 10, i.e. without preload in its open position. However, additionally or alternatively, it may also be desired that the catch 4 should be movable into an overtravel position beyond its open position from the direction of its closed position to create a gap between the hatch leaf 2 and the motor vehicle body 6, which a user can reach behind to further open the hatch leaf 2. For all these cases the driving force from the electric motor 10 may also be transmitted to the catch 4.

Moreover, the separate drivetrain component 23 may include the pawl lifter 21 or the displaceable drivetrain component 11 is engaged with a, in particular disk shaped, driving rotor 25 which, when the displaceable drivetrain component 11 is actuated in its actuating direction x2 by the electric motor 10 or the opening tool 12, can come into engagement with a catch transmitting element 26 being connected to the catch 4 in a rotationally fixed manner. Here the driving rotor 25 rotates about a geometrical driving rotor axis 25a and/or the catch transmitting element 26 rotates about a geometrical element axis 26a, and the geometrical driving rotor axis 25a and/or geometrical element axis 26a is coaxial with the geometrical catch axis 4a.

The expression "connected to the catch 4 in a rotationally fixed manner" means that the catch transmitting element 26 is an element separate from the catch 4, which can be coupled with or removed from the catch 4, or the catch transmitting element 26 is integrally connected to the catch 4.

As an example, the driving rotor 25 is a gear wheel 27, in particular having a circumferential section with gear teeth, which is engaged with a gear wheel 28 being connected in a rotationally fixed manner, in particular integrally connected, to the separate drivetrain component 23 may include the pawl lifter 21, in particular to a shaft 22 of the separate drivetrain component 23, or being connected in a rotationally fixed manner, in particular integrally connected, to the displaceable drivetrain component 11, in particular to a shaft 24 of the displaceable drivetrain component 11.

The drivetrain 9 provides a freewheel mechanism 29 which, in the operating state and service state of the drivetrain 9, allows the drivetrain 9 to first pivot the pawl arm 8 from its closed position towards its open position and then, once the pawl arm 8 no longer blocks the catch 4, to pivot the catch 4 from its respective closed position towards its open position.

Additionally it may be provided that a further freewheel mechanism, in the operating state and service state of the drivetrain 9, allows the drivetrain 9 to first pivot the catch 4 from its open position towards its respective closed position and then, once the catch 4 is in said closed position, to pivot the pawl arm 8 into its closed position.

As an example, the freewheel mechanism 29 is provided by the driving rotor 25 and the catch transmitting element 26.

In one or more embodiments, the driving rotor 25 may include at least one abutment contour 31 and the catch transmitting element 26 may include at least one assigned counter contour 32, and, when the drivetrain 9 pivots the pawl arm 8 from its closed position towards its open position until the pawl arm 8 no longer blocks the catch 4, the abutment contour 31 of the driving rotor 25 is not in contact with the assigned counter contour 32 of the catch transmitting element 26, and, after the pawl arm 8 no longer blocks the catch 4 the abutment contour 31 of the driving rotor 25 is in contact with the assigned counter contour 32 of the catch transmitting element 26 such that a driving force is transmitted from the driving rotor 25 to the catch transmitting element 26.

According to an independent, further teaching a motor vehicle lock 3 for a hatch leaf 2 is provided, and the motor vehicle lock 3 may include a catch 4 for the interaction with a lock striker 5, which catch 4 is pivotable about a geometrical catch axis 4a, and a pawl 7 having a pawl arm 8 for the interaction with the catch 4, which pawl arm 8 is pivotable about a geometrical pawl axis 7a, and the motor vehicle lock 3 can be brought into at least one closed state, in which the catch 4 is in a closed position and in direct holding engagement with the lock striker 5 and in which the pawl arm 8 is in an associated closed position, in which the pawl arm 8 is in direct holding engagement with the catch 4 blocking the catch 4 in its closed position, and, when the pawl arm 8 is in an open position releasing the catch 4, the motor vehicle lock 3 can be brought into an open state, in which the catch 4 is in an open position and releases the lock striker 5, and the motor vehicle lock 3 may include a drivetrain 9 consisting of several drivetrain components which, when engaged with each other in an operating state of the drivetrain 9, can transmit a driving force from an electric motor 10 to the pawl arm 8 to pivot the pawl arm 8 about the geometrical pawl axis 7a, in particular from its closed position into its open position.

Regarding the motor vehicle lock 3 according to the second teaching reference is made to all descriptions of the motor vehicle lock 3 according to the first teaching. In particular, each single feature described above with respect to the motor vehicle lock 3 according to the first teaching may also be provided in the motor vehicle lock 3 according to the second teaching.

The motor vehicle lock 3 may include, as a drivetrain component of the drivetrain 9, a, in particular disk shaped, driving rotor 25 which is rotatable about a geometrical driving rotor axis 25a, and a catch transmitting element 26 rotatable about a geometrical element axis 26a, which catch transmitting element 26 is connected to the catch 4 in a rotationally fixed manner. When the drivetrain 9 is actuated, in particular by the electric motor 10 or manually by the described opening tool 12, the driving rotor 25 can come into an engagement with the catch transmitting element 26.

In one or more embodiments, the catch 4, the pawl 7 with the pawl arm 8, the driving rotor 25 and the catch transmitting element 26 interact with each other, in particular together with a further drivetrain component receiving a driving force from the electric motor 10, in such a way that the motor vehicle lock provides at least two, preferably at least three, more preferably all of the functions "open-by-wire" (first function), "cinching" (second function), "push-out" (third function) and "push-in" (fourth function).

The function "open-by-wire" means that the pawl arm 8 is pivoted from its closed position blocking the catch 4 into its open position releasing the catch 4 by a driving force generated by the electric motor 10, and optionally that also the catch 4 is moved from its closed position into its open position by a driving force generated by the electric motor 10.

The function "cinching" means that the catch 4 is pivoted from its open position into a closed position, in particular in the first or second closed position, by the driving force generated by the electric motor 10.

The function "push-out" means that the catch 4 is pivoted from its closed position into an overtravel position which lies from the direction of the closed position beyond the opened position, and that pivoting movement of the catch 4 is caused by a driving force generated from the electric motor 10. When the catch 4 is in such an overtravel position, preferably a gap is created between the hatch leaf 2 and the motor vehicle body 6, which a user can reach behind to further open the hatch leaf 2.

The function "push-in" means that the pawl arm 8 is pivoted from its open position towards its closed position and in particular into its closed position by a driving force generated by the electric motor 10, in particular in a case where the pawl 7 is jammed in its respective open position, for example due to icing or dirt.

Figure 5:
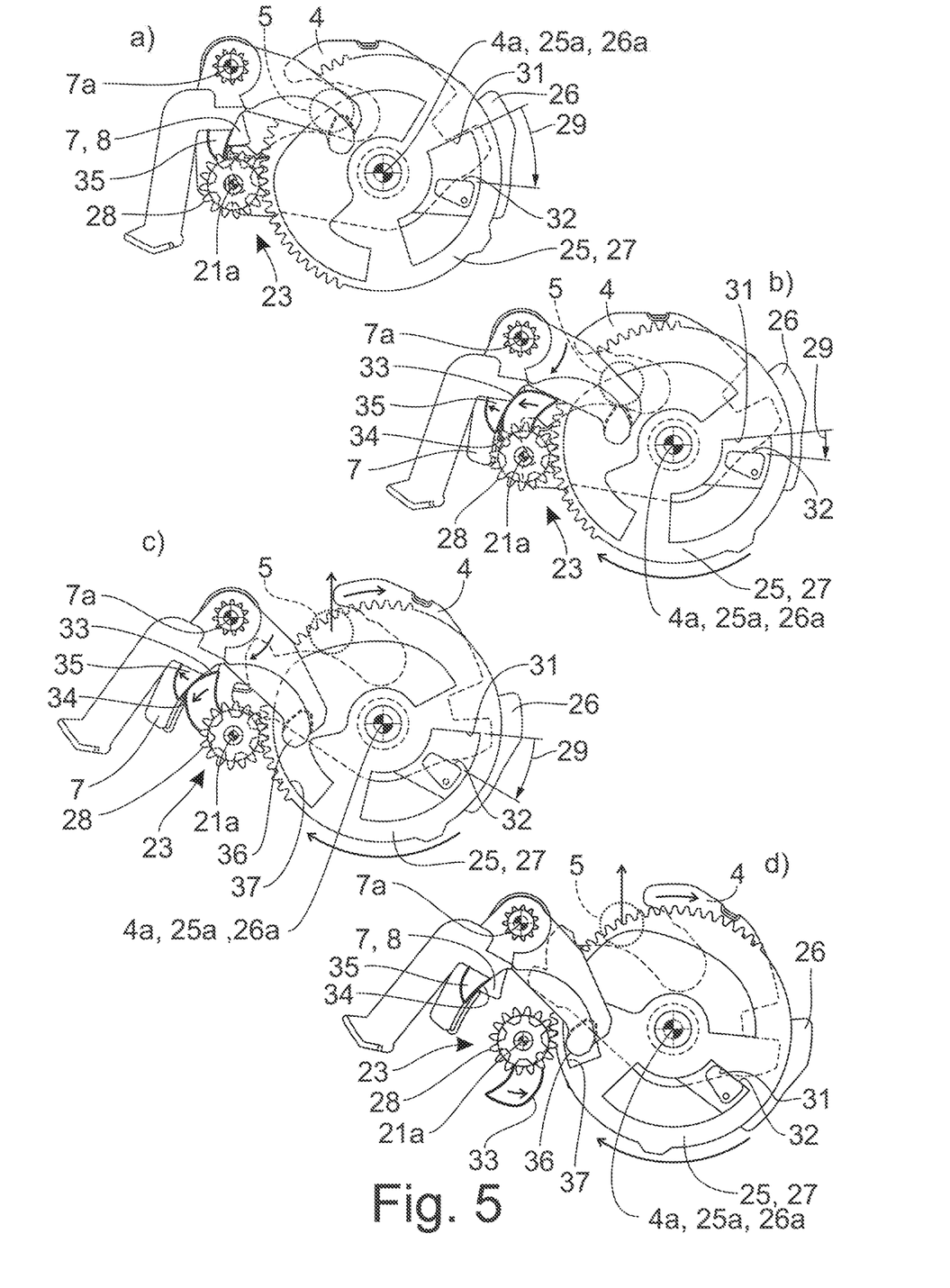
FIG. 5 is a schematic view of a section of the drivetrain while the motor vehicle lock is brought from a closed state to an open state and FIG. 6 is a schematic view of a section of the drivetrain while the motor vehicle lock is brought from the open state to the closed state.

FIG. 5 shows the function "open-by-wire". In FIG. 5a both the pawl arm 8 and the catch 4 are in their respective closed position. A drivetrain component 23, receiving a driving force from the electric motor 10, transmits the driving force to the driving rotor 25 on one hand and to the pawl 7 on the other hand (FIG. 5b)).

The driving force is transmitted from the drivetrain component 23 via the pawl lifter 21, which is connected in a rotationally fixed manner, preferably integrally connected, to the drivetrain component 23, to the pawl 7, such that the pawl 7 is pivoted from its closed position towards its opened position (FIG. 5c)).

As an example, the pawl lifter 21 may include a lifting contour 33 which, for pivoting the pawl 7, comes into engagement with an assigned counter contour 34 of the pawl 7, here of a projection 35 of the pawl 7. The lifting contour 33 pushes against the counter contour 34, when the drivetrain component 23 rotates. Thereby, the pawl 7 also rotates in a direction such that the pawl arm 8 pivots towards its open position.

At the same time, when the drivetrain component 23 rotates in this manner, the drivetrain component 23 transmits a driving force to the driving rotor 25, which also rotates from its initial position shown in FIG. 5a) towards an end position shown in FIG. 5b). As long as the pawl arm 8 has not released the catch 4, the driving rotor 25 does not come into contact with the catch transmitting element 26.

In case that the catch 4 is also pivoted motor driven from its closed position to its open position, the driving rotor 25 comes into contact with the catch transmitting element 26 after the pawl arm 8 has released the catch 4. Then, as described before, the abutment contour 31 of the driving rotor 25 comes into contact with the assigned counter contour 32 of the catch transmitting element 26, such that further rotation of the driving rotor 25 leads to a rotation of the catch transmitting element 26 and accordingly of the catch 4. However, in the shown embodiment, the catch 4 is only spring-driven towards its open position such that the abutment contour 31 does not come into engagement with the counter contour 32 until the driving rotor 25 is in its end position shown in FIG. 5b).

It is also conceivable that the position of the driving rotor 25 shown in FIG. 5b) is not the end position, but only an intermediate position, and that the driving rotor 25 can be rotated further, thereby moving the catch transmitting element 26 and the catch 4 beyond the position shown in FIG. 5b), such that the catch 4 pivots into the overtravel position described before ("push-out"-function).

FIG. 5b) also shows that here and preferably, when the catch 4 is in its open position or overtravel position, the pawl 7 is held in its open position in that a projection of the pawl 7 is held in a corresponding recess 37 preventing the pawl 7 from pivoting back towards its closed position by spring-load.

Figure 6:
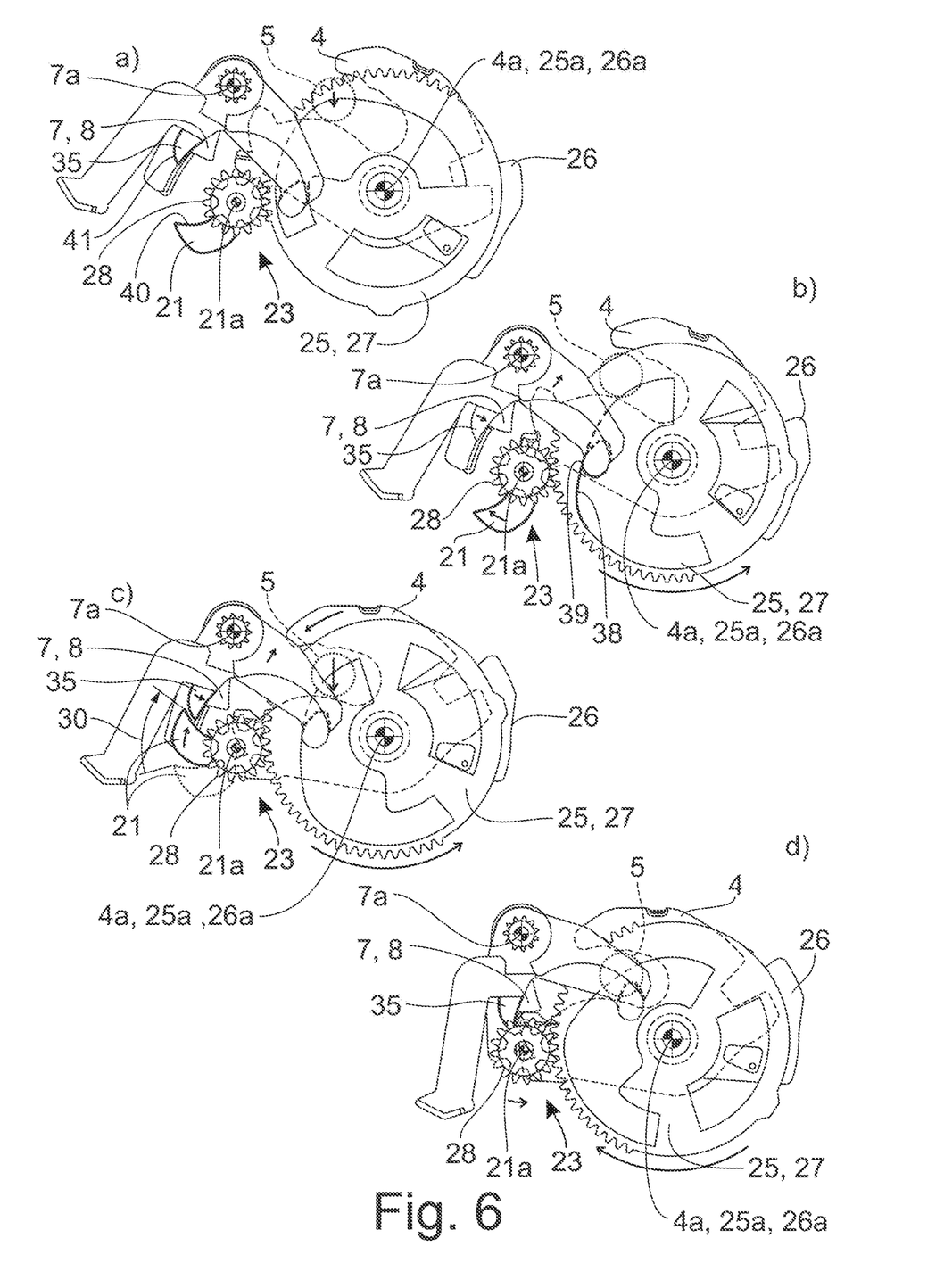

FIG. 6 shows the functions "push-in" and "cinching". In FIG. 6a the pawl arm 8 is still in its open position and the catch 4 has manually been moved by the lock striker 5 slightly from its open position (FIG. 5b)) towards its respective closed position. Then the drivetrain component 23, driven by the electric motor 10, transmits a driving force to the driving rotor 25 such that the driving rotor 25 rotates and releases the projection 36 of the pawl 7 from the recess 37 of the driving rotor 25.

In a normal state the pawl arm 8 would now automatically move towards its closed position by spring-load.

However, in case of a jamming, as shown in FIG. 6, the pawl 7 is motor driven towards and into its closed position. For this purpose, the driving rotor 25 may include a lifting contour 38 which comes into engagement with a counter contour 39 of the pawl 7, here of the projection 36 of the pawl 7. When the driving rotor 25 is further rotated, the lifting contour 38 causes the pawl 7 and the pawl arm 8 to pivot towards its closed position.

If the pawl 7 is still jammed, after a certain rotation of the pawl 7 towards its closed position, the lifting contour 21 of the drivetrain component 23 comes into engagement with the pawl 7, here with the projection 35. More preferably, here a push-in contour 40 of the pawl lifter 21 comes into engagement with an assigned counter contour 41 of the pawl 7, here of the projection 35.

As shown in FIG. 6c), the pawl lifter 21 than pushes the pawl 7 further, such that the pawl arm 8 pivots into its closed position shown in FIG. 6d).

Before the push-in contour 40 of the pawl lifter 21 comes into engagement with the assigned counter contour 41 of the pawl 7, the driving rotor 25, driven by the drivetrain component 23, comes into engagement with the catch transmitting element 26 (FIG. 6b)) and rotates the catch transmitting element 26 with the catch 4 such that the catch 4 pivots into its closed position (FIG. 6c)).

After the catch 4 is in its closed position the pawl arm 8 is pivoted in its respective closed position by the pawl lifter 21.

Finally, when the catch 4 and the pawl arm 8 are in their respective closed position the driving rotor 25 is rotated back into its initial position (FIG. 6d)).

According to another independent teaching, the present invention relates to a motor vehicle lock arrangement 1 may include a motor vehicle lock 3 as described before and a hatch leaf 2 and/or an opening tool 12 for engaging, displacing and moving, in particular rotating, the displaceable drivetrain component 11. Regarding the motor vehicle lock arrangement 1 reference is made to all explanations of the motor vehicle lock 3 according to the first teaching and the motor vehicle lock 3 according to the second teaching.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 1 motor vehicle lock arrangement
2 hatch leaf
3 motor vehicle lock
4 catch
5 lock striker
6 motor vehicle body
7 pawl
8 pawl arm
9 drive train
10 electric motor
11 drive train component
12 opening tool
13 opening
14 drive housing
15 housing opening
16 engagement section
17 gear wheel
18 motor-side gear wheel
19 motor shaft
20 gear wheel
21 pawl lifter
22 shaft
23 drive train component
24 shaft
25 driving rotor
26 catch transmitting element
27 gear wheel
28 gear wheel
29 freewheel mechanism
30 freewheel mechanism
31 abutment contour
32 counter contour
33 contour
34 counter contour
35 projection
36 projection
37 recess
38 contour
39 counter contour
40 push-in contour
41 assigned counter contour
4a geometrical catch axis
7a geometrical pawl axis
8a geometrical pawl axis
11a geometrical component axis
21a geometrical pawl lifter axis
25a geometrical driving rotor axis
26a geometrical element axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock for use in a hatch leaf, coupled to a vehicle body, and configured to change between a closed state and an open state, the motor vehicle lock comprising:
a catch configured to engage a lock striker and pivotable about a catch axis;
a pawl including a pawl arm configured to engage the catch and pivotable about a pawl axis,
wherein when the motor vehicle lock changes to the closed state, the catch is in a catch closed position and engages the lock striker, the pawl arm is in a pawl closed position, and the pawl arm engages and blocks the catch,
wherein, when the motor vehicle lock is in the open state, the pawl arm is in a catch open position and releases the catch, the catch is in a catch open position and releases the lock striker; and
a drivetrain including a number of drivetrain components provided with a displaceable drivetrain component, wherein when the drivetrain is in an operating state, each of the drivetrain components engage each other to transmit a driving force from an electric motor to the pawl arm to pivot the pawl arm about the pawl axis from the pawl closed position to a pawl open position,
wherein the displaceable drivetrain component is configured to be directly engaged by an opening tool, wherein the opening tool is configured to be moved along an engagement direction from a disengaged position, in which the opening tool is disengaged from the displaceable drivetrain component, to an engaged position in which the opening tool directly engages the displaceable drivetrain component, wherein the displaceable drivetrain component is configured to be displaced by moving the opening tool from the engaged position along a displacement direction so that the drivetrain changes from the operating state to a service state, wherein the displacement direction and the engagement direction are identical so that the drivetrain changes from the operating state to the service state when the opening tool is engaged with the displaceable drivetrain component, wherein when the drivetrain is in the service state, the drivetrain and the displaceable drivetrain component are separated from the electric motor, and wherein manual rotation of the opening tool, when the drivetrain is in the service state, actuates the displaceable drivetrain component by direct engagement between the displaceable drivetrain component and the opening tool in an actuating direction to actuate the drivetrain, without the electric motor, and to pivot the pawl arm about the pawl axis from the pawl closed position to the pawl open position.

2. The motor vehicle lock of claim 1, wherein the displacement direction of the displaceable drivetrain component is different from the actuating direction of the displaceable drivetrain component.

3. The motor vehicle lock of claim 1, wherein either the hatch leaf or the vehicle body defines an opening and the opening tool is configured to be inserted into the opening to engage the displaceable drivetrain component.

4. The motor vehicle lock of claim 1, further comprising:
a drive housing defining a housing opening, wherein the displaceable drivetrain component and the electric motor are disposed in the drive housing and the displaceable drivetrain component includes an engagement section protruding from the drive housing into the housing opening, and when the drivetrain is in the operating state, the engagement section is configured to move towards the drive housing.

5. The motor vehicle lock of claim 1, wherein when the drivetrain is in the operating state, the displaceable drivetrain component is spring-loaded and biased away from the displacement direction.

6. The motor vehicle lock of claim 1, wherein the displaceable drivetrain component is a gear wheel, wherein when the drivetrain is in the operating state, the gear wheel engages a motor-side gear wheel operatively connected to a motor shaft of the electric motor.

7. The motor vehicle lock of claim 1, further comprising:
a pawl lifter configured to engage and pivot the pawl arm as the displaceable drivetrain component actuates in the actuating direction.

8. The motor vehicle lock of claim 7, wherein the pawl lifter rotates about a pawl lifter axis and the displaceable drivetrain component rotates about a component axis, wherein the pawl lifter axis and the component axis extend in the same direction.

9. The motor vehicle lock of claim 8, wherein the pawl lifter is part of a separate drivetrain component connected to a shaft of the displaceable drivetrain component.

10. The motor vehicle lock of claim 1, wherein when the drivetrain is in the operating state, the drivetrain is configured to transmit a driving force from the electric motor to the catch to pivot the catch about the catch axis.

11. The motor vehicle lock of claim 10, further comprising:
a pawl lifter configured to engage and pivot the pawl arm as the displaceable drivetrain component actuates in the actuating direction;
a driving rotor having a disk shape; and
a catch transmitting element connected to the catch, wherein either the pawl lifter or the displaceable drivetrain component engages the driving rotor when the displaceable drivetrain component actuates in the actuating direction.

12. The motor vehicle lock of claim 11, wherein the driving rotor is a first gear wheel engaged to a second gear wheel integrally connected to the separate drivetrain component or to the displaceable drivetrain component.

13. The motor vehicle lock of claim 12, wherein the drivetrain includes a freewheel mechanism configured so that the drivetrain pivots the pawl arm from the pawl closed position towards the pawl open position and so that the pawl arm does not block the catch and the catch pivots from the catch closed position towards the catch open position.

14. The motor vehicle lock of claim 13, wherein the freewheel mechanism is formed by the driving rotor and the catch transmitting element and the driving rotor includes at least one abutment contour and the catch transmitting element includes at least one counter contour, wherein when the drivetrain pivots the pawl arm from the closed pawl position towards the pawl open position, the abutment contour does not in contact the counter contour and when the pawl arm does not block the catch, the abutment contour contacts the counter contour, so that force is transmitted from the driving rotor to the catch transmitting element.

15. A latch for use in a vehicle including a body and a tailgate connected to and configured to pivot away from and towards the body, the latch comprising:
a catch pivotable about a catch axis between a catch closed position and a catch open position and configured to engage a lock striker, when the latch is in a closed state and the catch is in the catch closed position;
a pawl pivotable about a pawl axis between a pawl open position and a pawl closed position and configured to engage and block the catch, when the latch is in the closed state and the pawl is in the pawl closed position;
a motor including a motor shaft;
a drivetrain configured to change between an operating state and a service state, and including,
a first gear configured to rotate about a first axis as the motor shaft rotates when the drivetrain is in the operating state and configured translate along the first axis from a first position to a second position to change the drivetrain from the operating state to the service state, a pawl lifter, wherein when the first gear is in the second position, the first gear is configured to pivot the pawl lifter to move the pawl from the pawl closed position of the pawl open position;

a second gear fixed to the pawl lifter;

a driving rotor including a number of teeth configured to engage the second gear and defining an opening; and a catch coupling bracket fixed to the catch and including a protrusion extending into the opening, wherein when the drivetrain is in the operating state, the first gear rotates the second gear and the second gear rotates the driving rotor so that a portion of an inner periphery of the opening engages the protrusion and rotates the catch towards the open position.

16. The latch of claim 15, further comprising:

a third gear fixed to the motor shaft;

a fourth gear engaged with the second gear and configured to rotate about a second axis; and a fifth gear fixed to the fourth gear and configured to engage the first gear when the drivetrain is in the operating state.

17. A latch for use in a vehicle including a body and a tailgate connected to and configured to pivot away from and towards the body, the latch comprising:

a catch pivotable about a catch axis between a catch closed position and a catch open position and configured to engage a lock striker, when the latch is in a closed state and the catch is in the catch closed position;

a pawl pivotable about a pawl axis between a pawl open position and a pawl closed position and configured to engage and block the catch, when the latch is in the closed state and the pawl is in the pawl closed position;

a motor including a motor shaft; and a drivetrain configured to change between an operating state and a service state, including, a first gear configured to rotate about a first axis as the motor shaft rotates when the drivetrain is in the operating state and defining an aperture configured to receive an opening tool and translate along the first axis from a first position to a second position to change the drivetrain from the operating state to the service state, when the opening tool is inserted into the aperture, a second gear, and a pawl lifter fixed to the second gear, wherein when the first gear is in the second position, the first gear is configured to rotate the second gear to pivot the pawl lifter to move the pawl from the pawl closed position of the pawl open position.

18. The latch of claim 17, wherein the pawl lifter is configured to rotate about the first axis.

\* \* \* \* \*